United States Patent
Harder et al.

(10) Patent No.: US 12,031,492 B2
(45) Date of Patent: Jul. 9, 2024

(54) ELECTRIC FUEL CONTROL CLOSED LOOP AIRCRAFT FUEL SYSTEM

(71) Applicant: Hamilton Sundstrand Corporation, Charlotte, NC (US)

(72) Inventors: James Harder, Charlotte, NC (US); Andrew W. Solomon, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/498,855

(22) Filed: Oct. 12, 2021

(65) Prior Publication Data
US 2023/0115336 A1 Apr. 13, 2023

(51) Int. Cl.
| F02C 7/236 | (2006.01) |
| F02C 9/28 | (2006.01) |
| F02C 9/30 | (2006.01) |
| F04D 13/06 | (2006.01) |

(52) U.S. Cl.
CPC .............. *F02C 9/30* (2013.01); *F02C 7/236* (2013.01); *F02C 9/28* (2013.01); *F04D 13/06* (2013.01); *F05D 2220/323* (2013.01); *F05D 2270/301* (2013.01); *F05D 2270/303* (2013.01)

(58) Field of Classification Search
CPC .. F02C 7/236; F02C 7/22; F02C 7/222; F02C 7/228; F02C 9/26; F02C 9/263; F02C 9/28
See application file for complete search history.

(56) References Cited

U.S. PATENT DOCUMENTS

| 5,406,784 | A | 4/1995 | Vertens et al. | |
| 6,996,970 | B2 | 2/2006 | Lorenz | |
| 8,126,629 | B2 * | 2/2012 | Buchalter | F02C 9/26 |
| | | | | 123/456 |
| 8,276,360 | B2 * | 10/2012 | Poisson | F01D 19/00 |
| | | | | 60/39.281 |
| 8,666,632 | B2 | 3/2014 | Zebrowski et al. | |
| 9,140,191 | B2 * | 9/2015 | Haugsjaahabink | F02C 7/22 |
| 9,512,783 | B2 | 12/2016 | Veilleux, Jr. et al. | |
| 10,087,852 | B2 * | 10/2018 | Eifert | F02C 9/26 |
| 11,060,461 | B2 * | 7/2021 | Turney | F02C 7/236 |
| 2009/0077945 | A1 * | 3/2009 | Cornwell | F23R 3/28 |
| | | | | 60/39.281 |

(Continued)

OTHER PUBLICATIONS

Extended European Search Report dated Feb. 20, 2023, issued during the prosecution of European Patent Application No. EP 22200926.8.

*Primary Examiner* — Thuyhang N Nguyen
(74) *Attorney, Agent, or Firm* — Kinney & Lange, P. A.

(57) ABSTRACT

A fuel control system for an aircraft includes first and second electric motor controlled fuel pumps connect in parallel with one another to a fuel line. A plurality of fuel nozzles are connected to the fuel line to issue pressurized fuel from the fuel line with the ability to throttle flow based on system needs along with the electric pumping. At least one fuel nozzle in the plurality of fuel nozzles includes a respective sensor system. A fuel controller is operatively connected to receive input from the respective sensor system of the at least one fuel nozzle, and operatively connected to control the first and second electric motor controlled pumps based on input from the respective sensor system of the at least one fuel nozzle.

15 Claims, 1 Drawing Sheet

(56) References Cited

U.S. PATENT DOCUMENTS

| | | | |
|---|---|---|---|
| 2011/0296846 A1* | 12/2011 | Aurousseau | F02C 7/275 |
| | | | 60/787 |
| 2014/0060658 A1* | 3/2014 | Hains | F02C 7/22 |
| | | | 137/2 |
| 2016/0138473 A1 | 5/2016 | Veilleux, Jr. et al. | |
| 2017/0167391 A1 | 6/2017 | Demelas | |
| 2018/0163636 A1* | 6/2018 | Griffiths | F02C 7/222 |
| 2018/0372321 A1 | 12/2018 | Yates et al. | |
| 2019/0112987 A1* | 4/2019 | O'Rorke | F02K 3/10 |
| 2020/0300168 A1* | 9/2020 | Herring | F02C 9/46 |
| 2021/0062729 A1* | 3/2021 | Durand | F02C 9/26 |

* cited by examiner

ELECTRIC FUEL CONTROL CLOSED LOOP AIRCRAFT FUEL SYSTEM

BACKGROUND

1. Field

The present disclosure relates to fuel control, and more particularly to electric fuel control for aircraft.

2. Description of Related Art

Traditional aircraft fuel architecture includes a boost pump and a separate, positive displacement pump within a fuel control. These supply fuel to the fuel nozzles for combustion in the combustor. The pumping elements provide the pressure while the valving within the fuel control throttles the flow for proper scheduling to the nozzles. Separate control units are required for pump motor control and engine control.

The conventional techniques have been considered satisfactory for their intended purpose. However, there is an ever present need for improved systems and methods for fuel control for aircraft. This disclosure provides a solution for this need.

SUMMARY

A fuel control system for an aircraft includes a first electric motor controlled fuel pump having an outlet operatively connected output pressurized fuel to a fuel line, and an inlet configured to receive fuel supplied from an aircraft fuel tank. A second electric motor controlled fuel pump has an outlet operatively connected output pressurized fuel to the fuel line, and an inlet configured to receive fuel supplied from the aircraft fuel tank. The first and second electric motor controlled fuel pumps connect in parallel with one another to the fuel line. A plurality of fuel nozzles are connected to the fuel line to issue pressurized fuel from the fuel line. At least one fuel nozzle in the plurality of fuel nozzles includes a respective sensor system. A fuel controller is operatively connected to receive input from the respective sensor system of the at least one fuel nozzle, and operatively connected to control the first and second electric motor controlled pumps based on input from the respective sensor system of the at least one fuel nozzle.

Each of the fuel nozzles in the plurality of fuel nozzles can include internal valving operatively connected to the controller so the controller can control fuel flow through the plurality of fuel nozzles by throttling the plurality of fuel nozzles and by controlling the first and second electric motor controlled pumps. The controller can be operatively connected to receive input from an engine controller, and can be configured to control the first and second electric motor controlled pumps based on input from the respective sensor system of the at least one fuel nozzle and from the engine controller. The engine controller can be a full authority digital engine control (FADEC). The controller can be combined with an engine controller.

The sensor system of the at least one fuel nozzle can include a pressure sensor on an inlet portion of the respective fuel nozzle and can be configured to produce an input signal indicative of nozzle inlet pressure from the fuel line. The sensor system of the at least one fuel nozzle can include a pressure sensor on an outlet portion of the respective nozzle and can be configured to produce an input signal indicative of nozzle outlet pressure. The sensor system of the at least one fuel nozzle can include a temperature sensor operatively connected to the respective nozzle to produce an input signal indicative of nozzle inlet and/or outlet temperature. The sensor system of the at least one fuel nozzle can include a flow sensor operatively connected to the respective nozzle to produce an input signal indicative of nozzle fuel flow volume. Each fuel nozzle in the plurality of fuel nozzles can include a respective sensor system operatively connected to provide input to the controller.

An engine heat exchanger can be operatively connected to the fuel line for heat exchange with fuel passing through the fuel line. The first and second electric motor controlled fuel pumps can be the only pumps in the fuel line. There need be no valves in the main line from the first and second electric motor controlled fuel pumps to the plurality of fuel nozzles. There need be no bypass line bypassing flow through the fuel line.

A method of controlling fuel flow in a gas turbine engine includes pressurizing fuel from a fuel tank by powering a pair of parallel electric motor controlled fuel pumps. The method includes receiving input from a plurality of fuel nozzles supplied by the electric motor controlled fuel pumps, and controlling the electric motor controlled fuel pumps with a closed loop feedback using the input from the plurality of fuel nozzles. Controlling can be performed by controlling valving in the plurality fuel nozzles.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
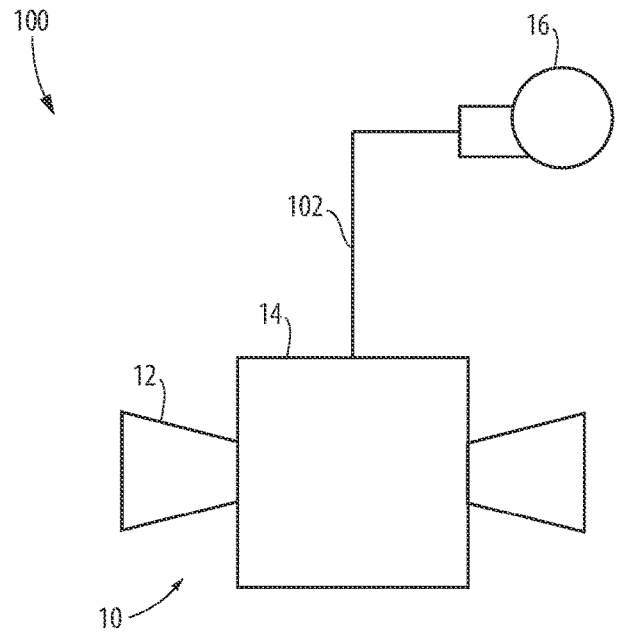
FIG. 1 is a schematic view of an embodiment of a system constructed in accordance with the present disclosure, showing the fuel control system connecting between an aircraft fuel tank and a gas turbine engine aboard the aircraft.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2, as will be described. The systems and methods described herein can be used for fuel control in aircraft, such as in more-electric aircraft.

A gas turbine engine, e.g. used for propulsion on an aircraft, includes a compressor 12, which feeds compressed air into a combustor 14. The combustor 14 also receives fuel for combustion from the fuel system 100, which conveys the fuel from a fuel tank 16, through a fuel line 102 and into the combustor 14 for combustion with compressor discharge air. The combustion products from the combustor 14 pass into the turbine 18, which extracts work from the combustion products to drive the compressor 12 and the balance of the power can be used in the case of a propulsive gas turbine engine to generate thrust, e.g. through an exhaust jet and/or by turning a fan, propeller, or other air mover.

Figure 2:
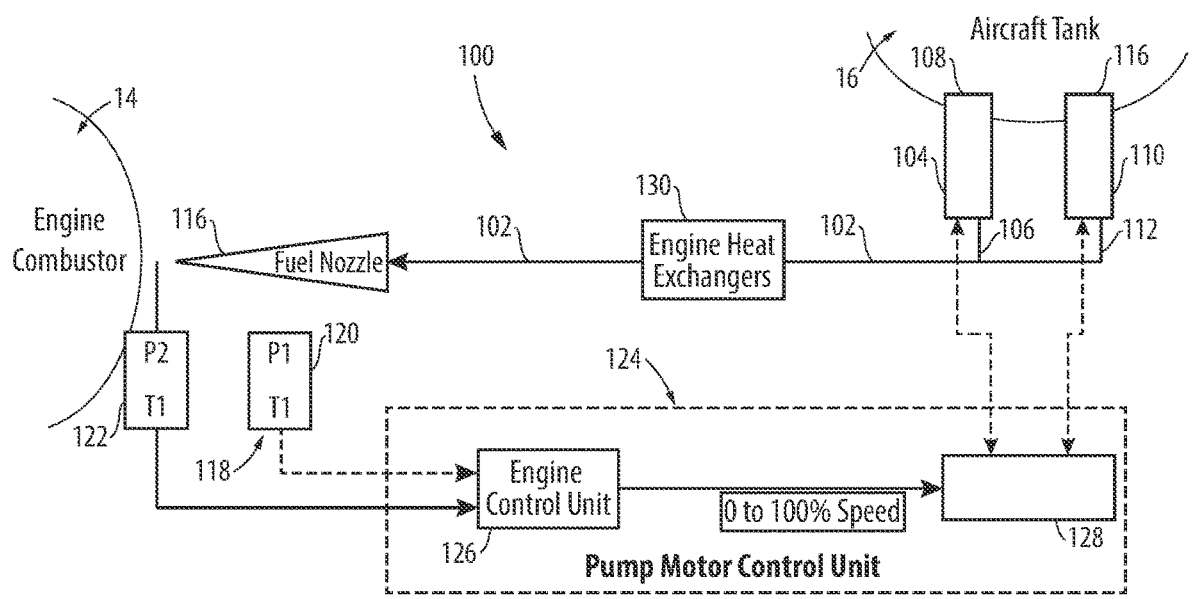
FIG. 2 is a is a schematic view of the fuel control system of FIG. 1, showing the dual electric motor controlled fuel pumps.

With reference now to FIG. 2, the fuel control system 100 includes a first electric motor controlled fuel pump 104 having an outlet 106 operatively connected output pressurized fuel to the fuel line 102, and an inlet 108 configured to receive fuel supplied from the aircraft fuel tank 16. A second electric motor controlled fuel pump 110 has an outlet 112 operatively connected output pressurized fuel to the fuel line 102, and an inlet 114 configured to receive fuel supplied from the aircraft fuel tank 16. The first and second pumps 104, 110 connect in parallel with one another between the fuel tank 16 and the fuel line 102. This gives redundancy as well as power for high capacity when needed and low turn down capability. The pumps 104, 110 are each a high speed or multi-stage motor controlled fuel pump.

A plurality of fuel nozzles 116 are connected to the fuel line 102 to issue pressurized fuel from the fuel line 102 into the combustor 14. For sake of clarity in the drawings, only one fuel nozzle 116 is depicted in FIG. 2, however those skilled in the art recognize that a typical gas turbine engine has several fuel nozzles 116 each connected to issue fuel into the combustor 14. At least one of the fuel nozzles 116 includes a respective sensor system 118, and it can be advantageous for all of the fuel nozzles 116 to include respective sensor systems 118.

The sensor system 118 can include a pressure sensor 120 on an inlet portion of the respective fuel nozzle 116 that is configured to produce an input signal indicative of nozzle inlet pressure from the fuel line 102. The sensor system 118 can also include a pressure sensor 122 on an outlet portion of the respective nozzle 116 that is configured to produce an input signal indicative of nozzle outlet pressure. One or both of the sensors 120, 122 can include a temperature sensor, as indicated in FIG. 2 by T1, operatively connected to the respective nozzle 116 to produce an input signal indicative of nozzle inlet and/or outlet temperature. Any other suitable type of sensor can be used for detecting flow through the respective nozzle 116 and producing a signal indicative of nozzle fuel flow volume.

A fuel controller 124 is operatively connected to receive input from the respective sensor system or systems 118 of fuel nozzles. The fuel controller 124 is also operatively connected to control the first and second electric motor controlled pumps 104, 110 based on input from the respective sensor system or systems 118 of the fuel nozzle 116. Each of the fuel nozzles 116 includes internal valving operatively connected to the controller 124 so the controller 124 can control fuel flow through the plurality of fuel nozzles 116 by throttling the plurality of fuel nozzles, based on system needs, and by controlling the first and second electric motor controlled pumps 104, 110.

The fuel controller 124 can be a single controller which combines an engine controller 126 and a pump motor controller 128. The pump motor controller 128 can be operatively connected to receive input from an engine controller 126, and is configured to control the first and second electric motor controlled pumps 104, 110 based on input from the respective sensor system(s) 118, which can be interpreted by the engine controller 126. The engine controller 126 can be a full authority digital engine control (FADEC), and the pump motor controller 128 can be combined as part of the FADEC, or can be a separate unit connected to receive input from the FADEC for commanded pump speeds.

An engine heat exchanger 130 can be operatively connected to the fuel line 102 for heat exchange between fuel passing through the fuel line 102 and other engine fluids such as air, oil, coolants, and the like. The first and second fuel pumps 104, 110 are the only pumps in the fuel line 102 between the fuel tank 16 and the combustor 14. There need be no valves in the main line 102 from the first and second electric motor controlled fuel pumps 104, 110 to the plurality of fuel nozzles 116, since control of the fuel pumps 104, 110 and controlling the valving in the nozzles 116 alone are sufficient to maintain control of fuel flow.

A method of controlling fuel flow in a gas turbine engine includes pressurizing fuel from a fuel tank, e.g. fuel tank 16 by powering a pair of parallel electric motor controlled fuel pumps, e.g. pumps 104, 110. The method includes receiving input from a plurality of fuel nozzles, e.g. through sensor system(s) 118, which are supplied by the electric motor controlled fuel pumps, and controlling the electric motor controlled fuel pumps and valving in the nozzles with a closed loop feedback using the input from the plurality of fuel nozzles.

The systems and methods as described herein can potentially enable the following benefits among other potential benefits. The fuel pumping can be more efficient than in traditional systems due to elimination of the bypass line. There can be a reduction in the number of components in the fuel system relative to the traditional configurations. Systems and methods as disclosed herein can eliminate positive displacement pumping and valving of the traditional fuel systems. There can also be reduction of one pad from the gearbox relative to traditional systems since the fuel pumps 104, 110 are electrically powered. The can be an overall reduced system complexity, weight and cost, and the systems and methods as disclosed herein are better in alignment with the more-electric strategic vector of ongoing aircraft design than are the traditional fuel systems.

The methods and systems of the present disclosure, as described above and shown in the drawings, provide for fuel control for aircraft such as more electric aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel control system for an aircraft comprising:
   a first electric motor controlled fuel pump having an outlet operatively connected output pressurized fuel to a fuel line, and an inlet configured to receive fuel supplied from an aircraft fuel tank;
   a second electric motor controlled fuel pump having an outlet operatively connected output pressurized fuel to the fuel line, and an inlet configured to receive fuel supplied from the aircraft fuel tank, wherein the first and second electric motor controlled fuel pumps connect in parallel with one another to the fuel line;
   a plurality of fuel nozzles connected to the fuel line to issue pressurized fuel from the fuel line into a combustor, wherein at least one fuel nozzle in the plurality of fuel nozzles includes a respective sensor system; and
   a fuel controller operatively connected to receive input from the respective sensor system of the at least one fuel nozzle, and operatively connected to control the first and second electric motor controlled pumps based on input from the respective sensor system of the at least one fuel nozzle, wherein the fuel controller is operatively connected to receive input from an engine controller, wherein the fuel controller is configured to control the first and second electric motor controlled pumps based on input from the respective sensor system of the at least one fuel nozzle and from the engine controller, wherein each of the fuel nozzles in the plurality of fuel nozzles includes an inlet portion upstream, an outlet portion downstream with respect to the fuel flow and internal valving operatively connected to the fuel controller so the fuel controller can control fuel flow through the plurality of fuel nozzles by throttling the plurality of fuel nozzles and by controlling the first and second electric motor controlled pumps, wherein the sensor system of the at least one fuel nozzle includes a pressure sensor on the outlet portion of the respective nozzle, the outlet portion is adjacent the combustor and configured to produce an input signal indicative of nozzle outlet pressure.

2. The system as recited in claim 1, wherein the engine controller is a full authority digital engine control (FADEC).

3. The system as recited in claim 1, wherein the fuel controller includes the engine controller and a pump controller, and wherein the engine controller is a full authority digital engine control (FADEC).

4. The system as recited in claim 1, wherein the sensor system of the at least one fuel nozzle includes a pressure sensor on an inlet portion of the respective fuel nozzle and is configured to produce an input signal indicative of nozzle inlet pressure from the fuel line.

5. The system as recited in claim 1, wherein the sensor system of the at least one fuel nozzle includes a temperature sensor operatively connected to the respective nozzle to produce an input signal indicative of nozzle inlet and/or outlet temperature.

6. The system as recited in claim 1, wherein the sensor system of the at least one fuel nozzle includes a flow sensor operatively connected to the respective nozzle to produce an input signal indicative of nozzle fuel flow volume.

7. The system as recited in claim 1, wherein each fuel nozzle in the plurality of fuel nozzles includes a respective sensor system operatively connected to provide input to the fuel controller.

8. The system as recited in claim 1, further comprising an engine heat exchanger operatively connected to the fuel line for heat exchange with fuel passing through the fuel line.

9. The system as recited in claim 1, wherein the first and second electric motor controlled fuel pumps are the only pumps in the fuel line.

10. The system as recited in claim 1, wherein there are no valves in a main line from the first and second electric motor controlled fuel pumps to the plurality of fuel nozzles.

11. The system as recited in claim 1, wherein there is no bypass line bypassing flow through the fuel line.

12. A method of controlling fuel flow in a gas turbine engine comprising:

pressurizing fuel from a fuel tank by powering a pair of parallel electric motor controlled fuel pumps;

receiving input from a plurality of fuel nozzles supplied by the electric motor controlled fuel pumps, wherein the plurality of fuel nozzles is connected to a fuel line to issue pressurized fuel from the fuel line into a combustor, each of the fuel nozzles in the plurality of fuel nozzles includes an inlet portion upstream, an outlet portion downstream with respect to the fuel flow, and at least one fuel nozzle in the plurality of fuel nozzles includes a respective sensor system operatively connected to a fuel controller; and controlling the pair of electric motor controlled fuel pumps with a closed loop feedback using the input from the plurality of fuel nozzles, wherein the fuel controller is operatively connected to receive input from an engine controller, wherein the fuel controller is configured to control the pair of electric motor controlled pumps based on input from the respective sensor system of the at least one fuel nozzle and from the engine controller, wherein controlling is performed by controlling valving in the plurality fuel nozzles, and controlling the first and second electric motor controlled pumps based on input from the respective sensor system of the at least one fuel nozzle and from the engine controller, wherein the sensor system of the at least one fuel nozzle includes a pressure sensor on the outlet portion of the respective nozzle, the outlet portion is adjacent the combustor and configured to produce an input signal indicative of nozzle outlet pressure.

13. A fuel control system for an aircraft comprising:

a first electric motor controlled fuel pump having an outlet operatively connected output pressurized fuel to a fuel line, and an inlet configured to receive fuel supplied from an aircraft fuel tank;

a second electric motor controlled fuel pump having an outlet operatively connected output pressurized fuel to the fuel line, and an inlet configured to receive fuel supplied from the aircraft fuel tank, wherein the first and second electric motor controlled fuel pumps connect in parallel with one another to the fuel line;

a plurality of fuel nozzles connected to the fuel line to issue pressurized fuel from the fuel line into a combustor, wherein at least one fuel nozzle in the plurality of fuel nozzles includes a respective sensor system; and a fuel controller operatively connected to receive input from the respective sensor system of the at least one fuel nozzle, and operatively connected to control the first and second electric motor controlled pumps based on input from the respective sensor system of the at least one fuel nozzle, wherein each of the fuel nozzles in the plurality of fuel nozzles includes an inlet portion upstream, an outlet portion downstream with respect to the fuel flow and internal valving operatively connected to the fuel controller so the fuel controller can control fuel flow through the plurality of fuel nozzles by throttling the plurality of fuel nozzles and by controlling the first and second electric motor controlled pumps, wherein the sensor system of the at least one fuel nozzle includes a pressure sensor on the outlet portion of the respective nozzle, the outlet portion is adjacent the combustor and configured to produce an input signal indicative of nozzle outlet pressure.

14. The system of claim 13, wherein each of the first and second electric motor controlled fuel pumps are directly connected to the fuel tank without any other intervening pumps in the fuel line between the fuel tank and each of the first and second electric motor controlled fuel pumps.

15. The system of claim 13, wherein none of the first and second electric motor controlled fuel pumps are positive displacement pump.

* * * * *